United States Patent [19]

Hwang

[11] Patent Number: 4,818,955
[45] Date of Patent: Apr. 4, 1989

[54] SYSTEM FOR GENERATING SIGNALS SUBJECT TO STATISTICALLY RANDOM FREQUENCY PERTURBATIONS

[75] Inventor: Yu-Tsang G. Hwang, Dix Hills, N.Y.

[73] Assignee: Republic Electronics Company, Hauppauge, N.Y.

[21] Appl. No.: 91,459

[22] Filed: Aug. 31, 1987

[51] Int. Cl.$^4$ .............................................. H03K 3/84
[52] U.S. Cl. ...................................... 331/78; 342/168; 342/171
[58] Field of Search ..................... 331/78; 342/14, 168, 342/169, 171; 364/717

[56] References Cited

U.S. PATENT DOCUMENTS 4,560,987 12/1985 Dochow et al. ..................... 342/171
4,644,357 2/1987 Schaaf et al. ........................ 342/168

*Primary Examiner*—Siegfried H. Grimm
*Attorney, Agent, or Firm*—Edward H. Loveman

[57] ABSTRACT

This system generates signals which vary randomly in frequency. The system includes a digital pulse generator generating multibit digital numbers varying randomly according to an encoded statistical distribution pattern. A first source of digital signals is connected to the pulse generator which perturbates the signals in frequency and applies them to an adder. Another source of digital signals connected to the adder combines with the perturbated first signal. A digital integrator connected to the pulse generator triggers release of the perturbated first signals and converts the combined perturbated signals to multibit outputs which may be applied to digital-to-analog converters, and in turn to frequency modulators to produce analog signals perturbated in accordance with the statistical distribution pattern.

10 Claims, 2 Drawing Sheets

SYSTEM FOR GENERATING SIGNALS SUBJECT TO STATISTICALLY RANDOM FREQUENCY PERTURBATIONS

BACKGROUND OF THE INVENTION

1. Field of the Invention

The invention relates to the art of pusle generating circuits and more particularly concerns an electronic system including digital circuits with finite steps to generate frequency modulated pulses which vary in frequency randomly according to a prescribed statiscal distribution pattern or scheme.

2. State of the Prior Art

In radar simulation systems it is known to provide signals which simulate chaff, i.e. large masses of scattered particles which reflect radar beams. Since such chaff floats in air streams, it is subject to variations in wind speeds and in wind shear. Furthermore, there is a Doppler effect due to variations in distance between the instantaneous location of the chaff and the detaching radar, which effect is manifested by increases or decreases in the frequency of the reflected radar beams. If the radar simulation of the chaff is to be usable and realistic, the frequency of the simulated reflected radar signal must be variable to represent the changing Doppler effect and the effects of changing wind speed and wind shear.

An analogous situation exists in analyzing problems in engineering, behavioral sciences, social sciences, economics and other fields, where it is necessary to simulate a random statistical variation in behavior of some condition. Stated another way, where any condition is subject to modification by noise, it is desirable to be able to simulate the condition subject to a prescribed random frequency distribution scheme which simulates the effect of the noise.

Heretofore, the only way that frequency or phase modulated pulses could be varied according to a prescribed statistical distribution pattern for condition simulation purposes, was to create a computer program embodied in software in which data representing the random perturbations desired would be detailed. This method presented a number of very serious difficulties. In the first place, a very large capacity computer such as one having main frame capabilities, would be required to process the data. Secondly, the method was not adaptable to miniaturized, low cost, realtime operation equipment. Thirdly, there is an infinitely large number of theoretically possible statistical frequency distribution patterns, including among others: Gaussian type, i.e. bell curves, Rayleigh type distributions, logarithmic distributions, infinitely variable frequency distributions, and many more; so that it has not been practical to provide a complete computer program embodied in software detailing each desired series of digital pusles varying randomly according to a prescribed statistical frequency density pattern of perturbations. Furthermore, it was not possible to obtain such randomly perturbated signals in analog format if required. In any event there has not heretofore been available miniature, low cost, light weight, digital or digital analog equipment producing in real time the described randomly varying signals.

It has been proposed in prior U.S. Pat. No. 4,560,961 to provide a system for converting a digital chirp history to analog format by employing digital-analog circuits with finite steps to generate continuous frequency modulated analog signals corresponding in frequency and phase to the phase history of the chirps or frequency sweeps. However, in this patented system there is no provision for perturbating the digital signals in accordance with a predetermined statistical frequency density distribution pattern.

3. Summary of the Invention

It is a principal object of the present invention to provide a system having discrete components which create in real time the desired signal simulations, i.e. those involving signal frequency variations which are perturbated randomly according to a prescribed statistical distribution pattern. According to the invention first and second series of pusle groups in digital number format are supplied to the system. The two series of digital pulse groups represent first and second signals having different but constant or nearly constant frequencies. The first signal is applied to one input of a first object adder. The second signal is applied to a statistical frequency density distributor to generate digital pusles having statistically random frequency density perturbations of the second signal. Thus, the second signal is converted into a noise signal having a frequency which varies constantly according to any predetermined statistical pattern of random frequency density distribution, such as Gaussian (bell curve), Rayleigh, lognormal, infinitely variable, etc.

The perturbated noise digital signal is applied to another input of the first adder. The digital output of the first adder represents the first signal input retaining an average frequency value but perturbated in frequency by the noise signals. The perturbated signals are fed to a digital integrator consisting of a second adder connected to a register with pulse feedback to the second adder. The digital integrator changes the frequency variations of the perturbated signals to phase changes. The output of the digital integrator contains digital sine and cosine wave components of the perturbated signals. The digital sine and cosine signal components which are in phase quadrature with respect to each other are applied to digital-to-analog converters to produce analog sine and cosine signal outputs. These analog cosine (in phase) signals and sine (in phase quadrature) signals are then separately frequency modulated on a radio frequency carrier. The modulated signals are then combined in an analog adder to produce a frequency modulated RF carrier whose frequency varies randomly in conformance with the perturbations originally imposed on the first signal.

These and other objects and many of the attendant advantages of the invention will be readily appreciated as the same becomes better understood by reference to the following detailed description when considered in connection with the accompanying drawings in which:

DETAILED DESCRIPTION OF THE INVENTION

Figure 1A:
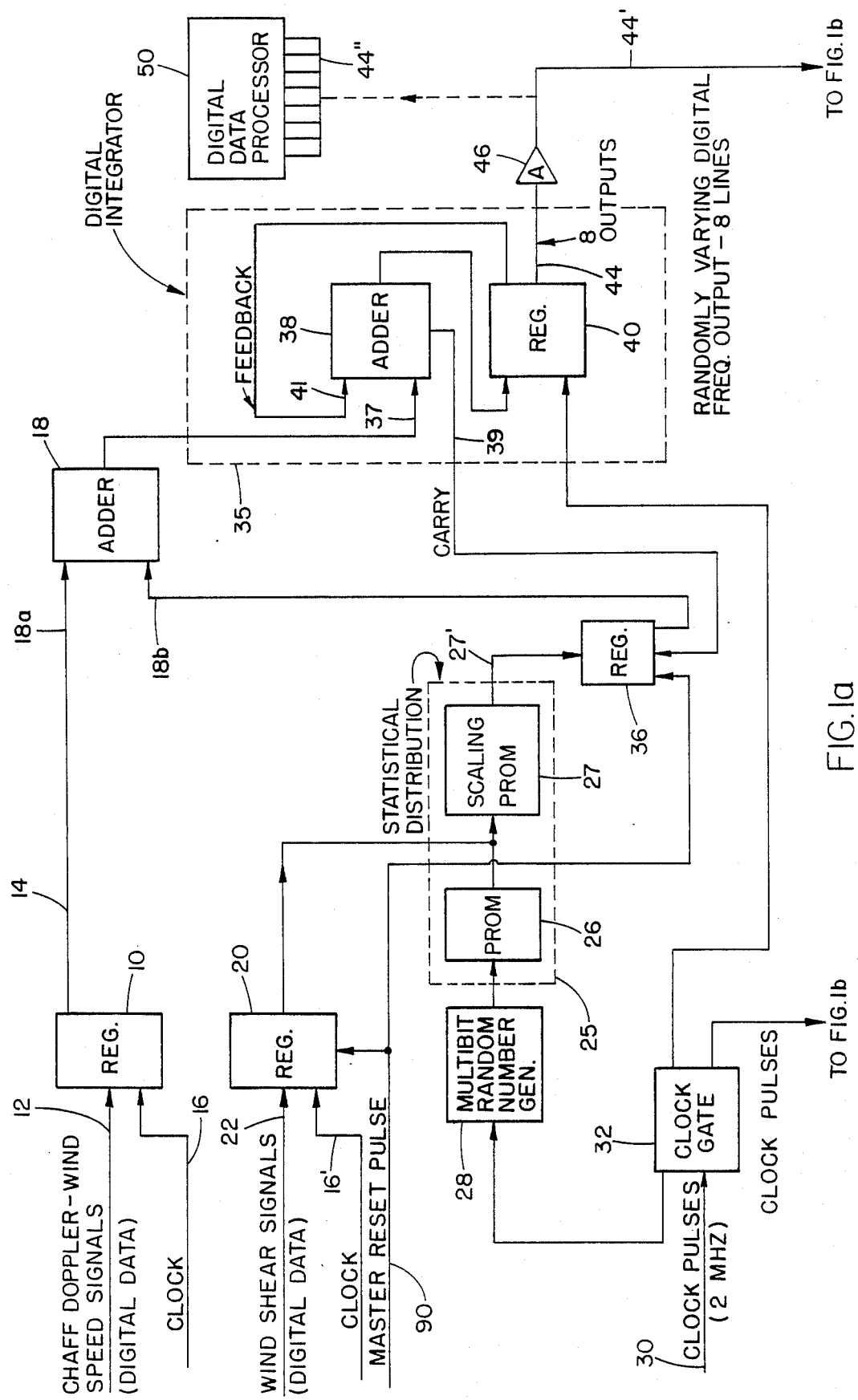
FIG. 1A is a logical block diagram of a digital system embodying the invention.

Referring now to FIG. 1A of the drawings there is shown a system for generating signals perturbated in frequency to random ways according to a prescribed statistical distribution pattern or scheme. The system will be explained with particular reference to simulated radar echoes reflected from a simulated bundle of chaff dispersed to form a cloud. A digital register 10 is supplied with simulated radar echo signals in digital format from any suitable source 12 such as a data record of actual radar echoes. These simulated signals vary in frequency from radar signals transmitted to the target or chaff due to the well known Doppler effect, i.e. the frequency of the echoes will be higher than that of the transmitted signals if the distance between the target or chaff and the radar transmitter is decreasing, and will be lower than that of the transmitted signals if the distance between the chaff and radar transmitter is increasing. In addition, the frequency of the received echoes will be further raised or lowered depending on the prevailing wind speed and its direction to which the chaff is subjected. The frequency of the Doppler-wind speed signals applied to the register 10 will vary in an envelope between prescribed limits. A digital output 14 from the register 10 under control of digital clock pulses supplied to the register 10 by a clock source 16, is applied to one input 18a of a digital adder 18.

Digital signals representing specified effects of wind shear on chaff are applied as an input to a second register 20 from a source 22. Clock pulses are also applied as another input to the register 20 from a clock source 16'. The wind shear signals are constant or nearly constant in frequency, and are in format of numbers which are applied to a statistical frequency density distributor 25. The distributor 25 consists of two interconnected PROMS (Programmable Read Only Memories) 26 and 27. The PROM 26 is encoded with a predetermined statistical frequency density pattern, for example, Gaussian and contains "bins" which receive numbers from a multibit random number signal generator 28. The changing number contents of the PROM 26 spill over to the PROM 27. The wind shear signals from the register 20 are also applied to the PROM 27 which introduces a predetermined scaling factor and determines the precise shape of the statistical frequency density pattern encoded in the PROM 26. The PROM 27 thus, combines the signals from the register 20 with the changing numbers from the PROM 26 to produce digital numbers representing a signal which varies randomly in frequency or perturbates in accordance with the predetermined statistical frequency density distribution pattern encoded in the PROM 26. The output 27' from the distributor 25 taken from the PROM 27 is applied to a register 36 which continuously updates the perturbed wind shear digital numbers and applies them to another input of the adder 18 under control of enabling pulses from a digital integrator assembly 35. The output from the adder 18 is applied to an input 37 of an adder 38. The output from the adder 18 is thus the Doppler-wind speed numbers, having an average value, but perturbating with a noise corresponding to the perturbed wind shear numbers.

The integrator assembly 35 includes the digital adder 38 connected to a register 40 which is kept in synchronism with the register 36 by clock pulses obtained from a source 30 via a gate 32. The adder 38 triggers the register 36 by carry pulses generated cyclically to apply the updated perturbed wind shear numbers to the adder 18. The register 40 feeds back digital pulses to an input 41 of the adder 38 to generate the cyclical carry pulses which trigger the register 36 to feed perturbated or noise signals to the adder 18 at an input 18b. The adder 38 and the register 40 operate as a digital integrator to produce a plurality of outputs. If the outputs are 8-bit numbers, there will be eight address lines 44 with each line provided with an amplifier driver 46. Collectively, on the address lines 44' at each closk pulse 30, the digital signals represent a randomly changed signal frequency. At this point, it is possible to apply the outputs from the amplifier drivers 46 on the line 44' to the inputs 44" of any suitable digital utilization device 50 such as a computer, digital processor, test equipment, monitor, etc.

Figure 1B:
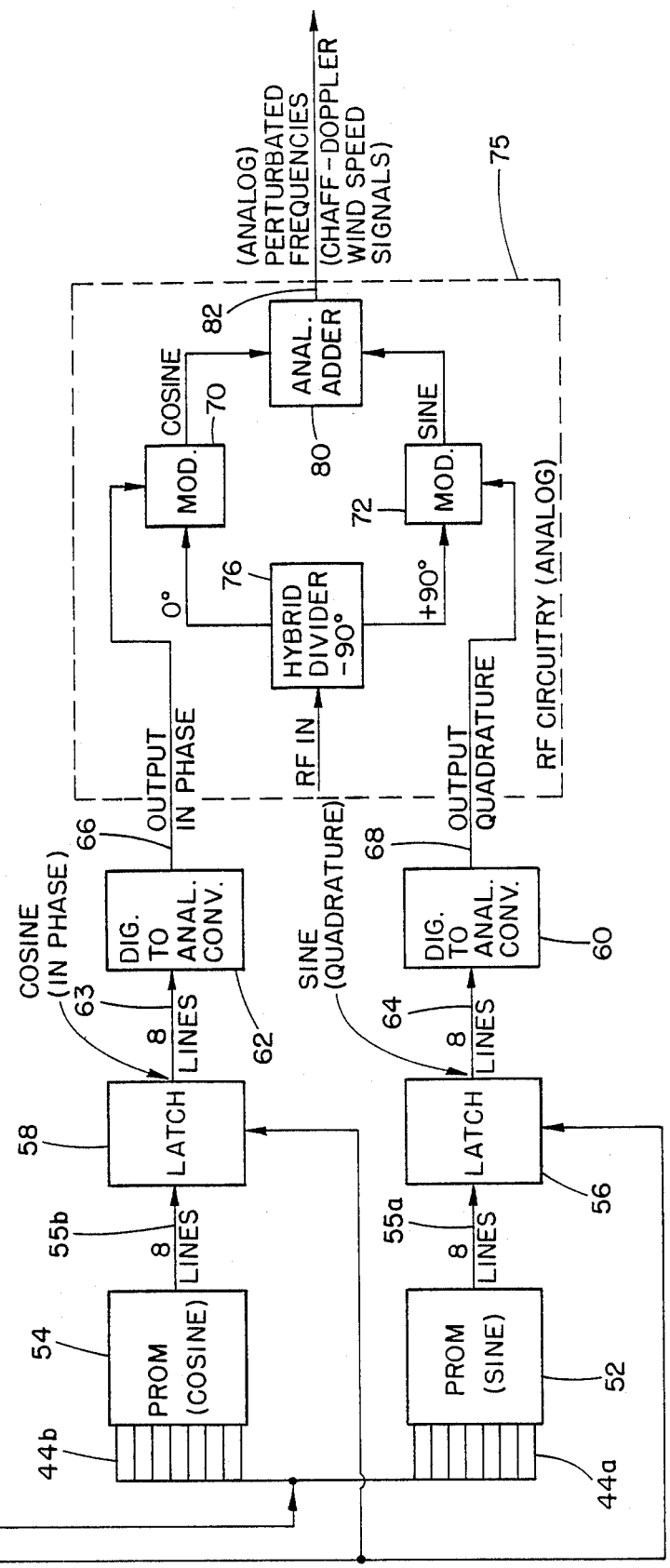
FIG. 1B is a block diagram for converting the digital pulses of FIG. 1A to an analog format.

Since, it is desirable that simulated frequency modulated radar echoes be in an analog format, the multibit digital outputs 44' are applied at inputs 44a, 44b (FIG. 1B) to a pair of PROMS 52, 54 which convert the randomly varying frequency or phase modulated signals into sine and cosine respective signals 55a, 55b which are in phase quadrature with respect to each other. By phase quadrature is meant that when one signal pulse is at maximum the other signal will be at zero and vice versa. The digital sine and cosine output signals 55a, 55b, are applied from the PROMS 52, 54 via a pair of respective latches 56, 58, to a pair of respective digital-to-analog converters 60, 62. The latches 56, 58, are actuated by the clock output from the gate 32 to prevent passage of data when the signals from the PROMS 52, 54 are in transit. The in-phase (0 degrees) digital cosine component signal is applied via eight lines 63 to the converter 62. The digital sine component signal in quadrature phase (90 degrees) is applied via eight lines 64 to the converter 60. The converter 62 produces in-phase output currents in analog format whereas the converter 60 produces analog output currents in quadrature phase. The outputs from the converters 62 and 60 are applied via lines 66 and 68 respectively to a pair of balanced FM modulators 70, 72 in radio frequency circuit 75. At the modulators 70, 72, the current inputs are in phase quadrature (0 degrees, 90 degrees). A radio frequency carrier is applied via a hybrid divider 76 to the modulators 70, 72 to produce cosine and sine modulation of the carrier. These modulated signals are applied to an in-phase analog adder 80 where the signals are combined to produce a continuous frequency modulated radio frequency wave shape. The frequency of the wave at an adder output 82 varies in random ways according to the predetermined statistical distribution pattern determined at statistical distribution generator 25. A source 90 of master reset pulses connected to the registers 20 and 36 is provided for resetting the registers when required.

While the system has been explained with particular reference to a Doppler signal affected by wind speed and wind shear noise, it will be understood that the signal input at the digital register 10 may be digital data representing the signal frequency of any changing condition, and the signal input at digital register 20 may represent any other prescribed condition to be perturbated and superimposed on the data applied by the source 12 to the register 10. The superimposed signal and noise (or random statisticaly distributed perturbations) can be taken at an output 44' for processing digitally in the digital utilization device 50 or they can be converted to perturbated frequency signals in analog format obtained at the output 82.

The system can be manufactured in miniature form using conventional components readily available commercially. It will also be light in weight, and readily portable for use wherever required. It will be inexpensive to manufacture as compared with a complex computer system porgrammed to perform similar frequency perturbation functions. Once set up, the system will be entirely automatic in operation.

It should be understood that the foregoing relates to only a preferred embodiment of the invention which has been disclosed by way of example only, and that it is intended to cover all the changes and modifications of the example of the invention herein chosen for the purpose of the disclosure, which do not constitute departures from the spirit and scope of the invention.

What is claimed is:

1. A system for generating signals which vary randomly in frequency in accordance with a predetermined frequency density statistical distribution pattern, comprising:

a digital pulse generator means for generating a succession of pulse groups representing a multiplicity of digital numbers varying randomly in accordance with a predetermined statistical frequency density distribution pattern encoded in said digital pulse generator means;

a first source means of digital number pulse groups representing first signals of substantially constant average frequency, the output of said first source means connected to said digital pusle generator means whereby the output from said digital pulse generator means produces perturbations in frequency of said first signals, said perturbations in frequency varying randomly but distributed in density in accordance with said predetermined statistical distribution pattern;

digital adder means connected to the output of said digital pulse generator means to receive said perturbated first signals;

a second source means of other digital number pulse groups representing second signals of substantially constant average frequency, said second source means connected to said digital adder means for addition to said perturbated first signals to produce further digital number pulse groups representing third signals having an average frequency perturbated randomly in accordance with said predetermined statistical frequency density pattern; and digital integration means connected to said digital pulse generator means to trigger release of said perturbated first signals to said adder means, and connected to said adder means to convert said third digital number pulse groups to multibit outputs.

2. A system as defined in claim 1, wherein said digital pulse generator means comprises:

a generator of multibit random numbers;
   memory means providing bins for storing said random numbers in accordance with said encoded statistical frequency density distribution pattern; and
   scaling means for determining the shape of said pattern.

3. A system as defined in claim 1, wherein said digital integration means comprises:

other digital adder means connected to said digital pulse generator means to apply carry pulses which trigger said digital pulse generating means to release said perturbated first signals to said first named adder means; and
   register means connected to the output of said other adder means, said register means providing an output feedback circuit for triggering said other digital adder means to apply said carry pulses to said digital generator means.

4. A system as defined in claim 3, further comprising multiple output lines connected to said register means for applying said multibit outputs to digital pulse processing means.

5. A system as defined in claim 1, further comprising digital-to-analog converter means connected in circuit with said multibit outputs, for converting said multibit outputs to analog format.

6. A system as defined in claim 5, further comprising analog frequency modulation means connected to said digital-to-analog converter means to produce perturbated frequencies in analog format corresponding in perturbations to said predetermined statistical frequency density pattern.

7. A system as defined in claim 1, wherein said digital pulse generator means comprises:

a generator of multibit random numbers;
   a first PROM connected to the output of said generator for providing bins for storing said random numbers in sequence in accordance with said encoded statistical frequency distribution pattern; and
   a scaling PROM connected to the output of said first PROM for determining the shape of said pattern.

8. A system as defined in claim 7, wherein said digital integration means comprises:

other digital adder means connected to said digital pulse generator means to apply carry pulses which trigger said digital pulse generating means to release said perturbated first signals to said first named adder means; and
   register means connected to the output of said other adder means, said register means providing an output feedback circuit for triggering said other digital adder means to apply said carry pulses to said digital pulse generator means.

9. A system as defined in claim 8, further comprising:

multiple output lines connected to said register means for producing thereat said multibit outputs; and
   digital-to-analog converter means connected in circuit with said multiple output lines for converting said multibit outputs to analog format.

10. A system as defined in claim 9, further comprising analog frequency modulation means connected in circuit with said digital-to-analog converter means to produce perturbated frequencies in analog format corresponding in perturbations to said predetermined statistical frequency density pattern.

* * * * *